United States Patent
Chandramohanan

(10) Patent No.: US 11,215,111 B2
(45) Date of Patent: Jan. 4, 2022

(54) TURBOCHARGER HAVING A THERMAL DAM

(71) Applicant: BorgWarner Inc., Auburn Hills, MI (US)

(72) Inventor: Raj Chandramohanan, Fletcher, NC (US)

(73) Assignee: Borg Warner Inc., Auburn Hills, MI (US)

( * ) Notice: Subject to any disclaimer, the term of this patent is extended or adjusted under 35 U.S.C. 154(b) by 0 days.

(21) Appl. No.: 16/851,304

(22) Filed: Apr. 17, 2020

(65) Prior Publication Data
US 2021/0324788 A1 Oct. 21, 2021

(51) Int. Cl.
*F02B 33/40* (2006.01)
*F02C 6/12* (2006.01)
*F01D 25/16* (2006.01)

(52) U.S. Cl.
CPC .............. *F02B 33/40* (2013.01); *F01D 25/16* (2013.01); *F02C 6/12* (2013.01); *F05D 2220/40* (2013.01); *F16C 2360/24* (2013.01)

(58) Field of Classification Search
CPC ........ F02B 33/40; F02B 39/005; F02B 39/14; F02B 37/00; F01D 25/16; F02C 6/12; F05D 2220/40; F16C 2360/24; F01M 5/00–04
See application file for complete search history.

(56) References Cited

U.S. PATENT DOCUMENTS

| | | | |
|---|---|---|---|
| 2,582,916 A * | 1/1952 | Taub | F01D 25/125 60/599 |
| 4,725,206 A | 2/1988 | Glaser et al. | |
| 7,108,488 B2 * | 9/2006 | Larue | F16C 17/024 384/103 |
| 8,308,431 B2 | 11/2012 | Ueno et al. | |

(Continued)

FOREIGN PATENT DOCUMENTS

| CN | 201818332 U | 5/2011 |
|---|---|---|
| DE | 102014223306 A1 | 5/2016 |
| DE | 102016207131 A1 | 11/2017 |

OTHER PUBLICATIONS

English language abstract and machine-assisted English translation for CN 201818332 extracted from espacenet.com database on Jun. 15, 2020, 4 pages.

(Continued)

*Primary Examiner* — Jesse S Bogue
*Assistant Examiner* — Loren C Edwards
(74) *Attorney, Agent, or Firm* — Howard & Howard Attorneys PLLC

(57) ABSTRACT

A turbocharger includes a shaft extending along an axis, a compressor wheel coupled to a first end of the shaft, a turbine wheel coupled to a second end of the shaft and having a first diameter; and a bearing housing extending about the shaft. The bearing housing is disposed between the compressor wheel and the turbine wheel. The bearing housing having a thermal dam having a volume extending circumferentially about the shaft and disposed proximate to the second end of the shaft between the compressor wheel and the turbine wheel. The thermal dam has a second diameter extending radially from the shaft. Moreover, the second diameter of the thermal dam is between 1.1 and 1.2 times greater than the first diameter of the turbine wheel.

16 Claims, 6 Drawing Sheets

(56) References Cited

U.S. PATENT DOCUMENTS

| | | | |
|---|---|---|---|
| 8,353,666 B2 | 1/2013 | Masson et al. | |
| 9,212,700 B1 * | 12/2015 | Bucking | F16C 37/007 |
| 9,638,203 B2 | 5/2017 | Bucking et al. | |
| 9,677,419 B2 | 6/2017 | Heidingsfelder et al. | |
| 9,988,977 B2 | 6/2018 | Crandall et al. | |
| 10,415,458 B2 * | 9/2019 | Niwa | F02B 37/004 |
| 2011/0014036 A1 | 1/2011 | Boening et al. | |
| 2016/0341072 A1 | 11/2016 | Chandramohanan et al. | |
| 2017/0037773 A1 | 2/2017 | John et al. | |
| 2017/0298761 A1 | 10/2017 | Williams et al. | |
| 2018/0003104 A1 | 1/2018 | Race | |
| 2019/0112945 A1 | 4/2019 | Kurle et al. | |

OTHER PUBLICATIONS

Machine-assisted English language abstract and machine-assisted English translation for DE 10 2014 223 306 extracted from espacenet.com database on Jun. 15, 2020, 10 pages.

Machine-assisted English language abstract and machine-assisted English translation for DE 10 2016 207 131 extracted from espacenet.com database on Jun. 15, 2020, 12 pages.

* cited by examiner

TURBOCHARGER HAVING A THERMAL DAM

BACKGROUND OF THE INVENTION

1. Field of the Invention

The present invention generally relates to a turbocharger and more particularly to a turbocharger having a thermal dam.

2. Description of the Related Art

Turbochargers include a turbine wheel, a compressor wheel coupled to the turbine wheel through a shaft, and a bearing housing extending about the shaft and disposed between the turbine wheel and the compressor wheel. Turbochargers use exhaust flow from an internal combustion engine and deliver compressed air to the internal combustion engine. More specifically, turbochargers use exhaust flow to spin the turbine wheel. The turbine wheel, in turn, rotates the shaft which rotates the compressor wheel to deliver the compressed air the internal combustion engine. However, the exhaust flow used to spin the turbine wheel is very hot which in turn leads to components of the bearing housing adjacent to the turbine wheel also getting hot, which can cause turbocharger failure.

Some of the conventional turbochargers use water-cooled bearing housings to keep components of the bearing housing below critical temperatures to prevent turbocharger failure. However, water cooling requires additional components in the bearing housing. Further, the used hot water from the water cooling produces waste heat which can lead to higher vehicle emissions.

As such, there remains a need to provide an improved turbocharger.

SUMMARY OF THE INVENTION AND ADVANTAGES

A turbocharger for delivering compressed air to an internal combustion engine includes a shaft extending along an axis between a first end and a second end spaced from the first end along the axis. The turbocharger also includes a compressor wheel coupled to the first end of the shaft and a turbine wheel coupled to the second end of the shaft and having a first diameter. Moreover, the turbocharger includes a bearing housing extending about the shaft and disposed between the compressor wheel and the turbine wheel. The bearing housing having a thermal dam having a volume extending circumferentially about the shaft and disposed proximate to the second end of the shaft between the compressor wheel and the turbine wheel. The thermal dam defines a second diameter and the second diameter of the thermal dam is between 1.1 and 1.2 times greater than the first diameter of the turbine wheel.

Moreover, an additional turbocharger for delivering compressed air to an internal combustion engine is disclosed. The turbocharger includes a shaft extending along an axis between a first end and a second end spaced from the first end along the axis, a compressor wheel coupled to the first end of the shaft, and a turbine wheel coupled to the second end of the shaft and having a first diameter. The turbocharger also includes a bearing housing extending about the shaft and disposed between the compressor wheel and the turbine wheel. The bearing housing includes an inner bearing surface defining a thermal dam which has a volume extending circumferentially about the shaft and disposed proximate to the second end of the shaft between the compressor wheel and the turbine wheel. The turbocharger also includes a heat shield disposed adjacent to the second end of the shaft and configured to close the volume of the thermal dam. An axial distance of the thermal dam is defined between the inner bearing surface and the heat shield, and the axial distance of the thermal dam is between 0.3 and 0.4 times the first diameter of the turbine wheel.

Accordingly, having the second diameter of the thermal dam being between 1.1 and 1.2 times greater than the first diameter of the turbine wheel and/or having the axial distance of the thermal dam between 0.3 and 0.4 times the first diameter of the turbine wheel reduces heat transfer to other components in the bearing housing, and reduces heat transfer to the compressor during operation and also during hot shutdown of the turbocharger. This provides a myriad of benefits to the turbocharger including, but not limited to, sealing improvements, increased compressor performance, and increased bearing stability and increased bearing life. Moreover, the turbocharger having the thermal dam as described herein allows target temperatures of the turbocharger to be reached without including water cooling.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
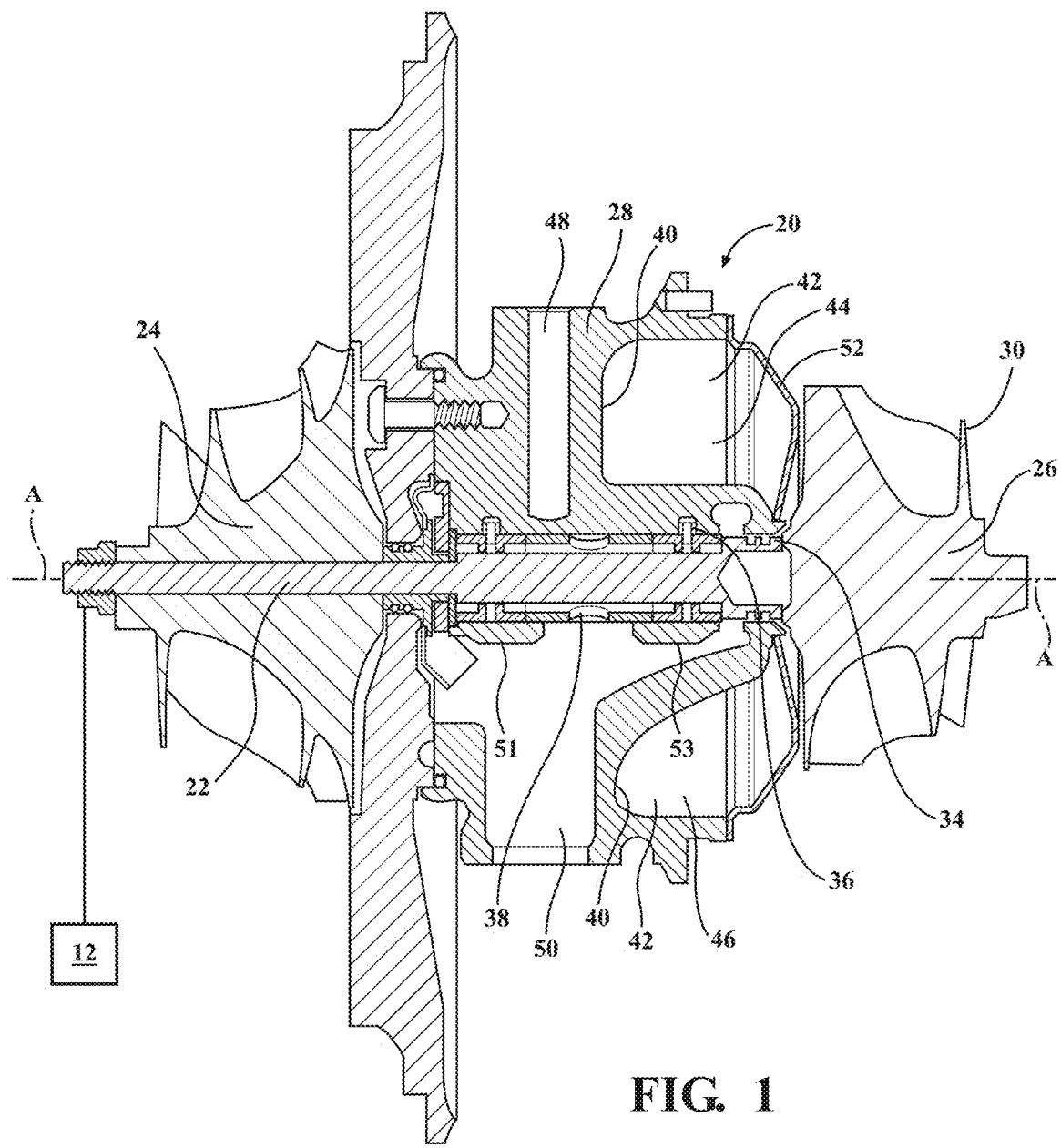
FIG. 1 is a cross-sectional view of a vehicle system including a turbocharger having a thermal dam.

With reference to the Figures, wherein like numerals indicate like parts throughout the several views, a turbocharger 20 is generally shown in FIG. 1. The turbocharger 20 is coupled to a vehicle engine 12 such as an internal combustion engine 12, however, it is contemplated that the vehicle engine may be any type of power generator including but not limited to an electric motor, a battery, or a fuel cell. The turbocharger 20 receives exhaust gas from the internal combustion engine 12 and delivers compressed air to the internal combustion engine 12.

Although not required, the turbocharger 20 is typically used in passenger and commercial automotive applications. However, it is to be appreciated that the turbocharger 20 may be used in non-automotive applications such as heavy equipment applications, non-automotive diesel engine applications, non-automotive motor applications, and the like.

With reference again to FIG. 1, the turbocharger 20 typically includes a turbocharger shaft 22, a compressor wheel 24, a compressor housing, a turbine wheel 26, a turbine housing, and a bearing housing 28. The compressor wheel 24 is disposed in the compressor housing. During operation of the turbocharger 20, the turbine wheel 26 receives exhaust gas from the internal combustion engine 12 which causes the turbine wheel 26 to rotate. The turbocharger shaft 22 is coupled to and rotatable by the turbine wheel 26. The compressor wheel 24 is coupled to the turbocharger shaft 22 and is rotatable by the turbocharger shaft 22 for delivering compressed air to the internal combustion engine 12.

As best illustrated in FIG. 1, the shaft 22 extends along an axis A between a first end and a second end spaced from the first end along the axis A. The shaft 22 is typically solid and configured to be coupled to the compressor wheel 24 on the first end of the shaft 22 and to the turbine wheel 26 on the second end of the shaft 22. The turbine wheel 26 and the turbine housing may be an axial or a radial flow turbine. The turbine wheel 26 is typically comprised of a plurality of blades 30 configured to rotate. Moreover, the turbine wheel 26 has a first diameter 32. The first diameter 32 is measured perpendicular to the axis A and from a tip of one blade 30 to a tip of an opposite blade 30. In other words, in operation when the blades 30 rotate, they form a circle having the first diameter 32 of the circle, and thus the turbine wheel 26, measured perpendicular to the axis A. It is also contemplated that the first diameter 32 may be measured along another axis A or otherwise measured by one of ordinary skill in the art. In one example, the first diameter 32 of the turbine wheel 26 is between 50 and 150 mm. In another example, the first diameter 32 of the turbine wheel 26 is approximately 50 mm-60 mm. In yet another example, the first diameter 32 of the turbine wheel 26 is approximately 90-110 mm. However, other ranges are to be contemplated.

Referring back to FIG. 1, the bearing housing 28 extends about the turbocharger 20 shaft 22 between the turbine wheel 26 and the compressor wheel 24. The bearing housing 28 also houses other components of the turbocharger 20 including, but not limited to, at least one piston ring 34 configured to move within a bore defined in the bearing housing 28, a plurality of thrust bearings 36 configured to support a high axial load parallel to the axis A, and a plurality of seals 38 configured to prevent leakage of fluid from the bearing housing 28. It is also contemplated that the bearing housing 28 may include, define, and/or house a plurality of other components as known by one of ordinary skill in the art.

The bearing housing 28 includes an inner bearing surface 40 which defines a thermal dam 42. The thermal dam 42 defines a volume extending circumferentially about the shaft 22. Moreover, the thermal dam 42 is disposed proximate to the second end of the shaft 22 between the compressor wheel 24 and the turbine wheel 26. As best illustrated in FIG. 1, the thermal dam 42 is a void in the bearing housing 28 and includes an upper dam 44 extending above the shaft 22 and a lower dam 46 which extends below the shaft 22. It is contemplated that the upper dam 44 and the lower dam 46 are sized and shaped the same. However, as illustrated in FIG. 1, the upper dam 44 and the lower dam 46 may have different sizes and shapes to accommodate other features of the bearing housing 28 including, but not limited to, a fluid inlet 48 and/or a fluid drain 50. Typically, the bearing housing 28 having the thermal dam 42 is comprised of stamped metal and is generally produced by stamping. However, it is also contemplated that the bearing housing 28 may be produced by another method including, but not limited to, casting, rolling, or forging.

As best illustrated in FIG. 1, the bearing housing 28 defines the fluid inlet 48 disposed adjacent to the upper dam 44 of the thermal dam 42 between the compressor wheel 24 and the thermal dam 42 for allowing fluid into the bearing housing 28. Moreover, the bearing housing 28 further defines the fluid drain 50 disposed adjacent to the lower dam 46 of the thermal dam 42 between the compressor wheel 24 and the thermal dam 42 for allowing excess fluid out of the bearing housing 28. The fluid which is allowed to flow through the fluid inlet 48 and the fluid drain 50 may be any fluid including, but not limited to, lubricating oil, cooling water, or another fluid as desired by one or ordinary skill in the art.

Figure 2:
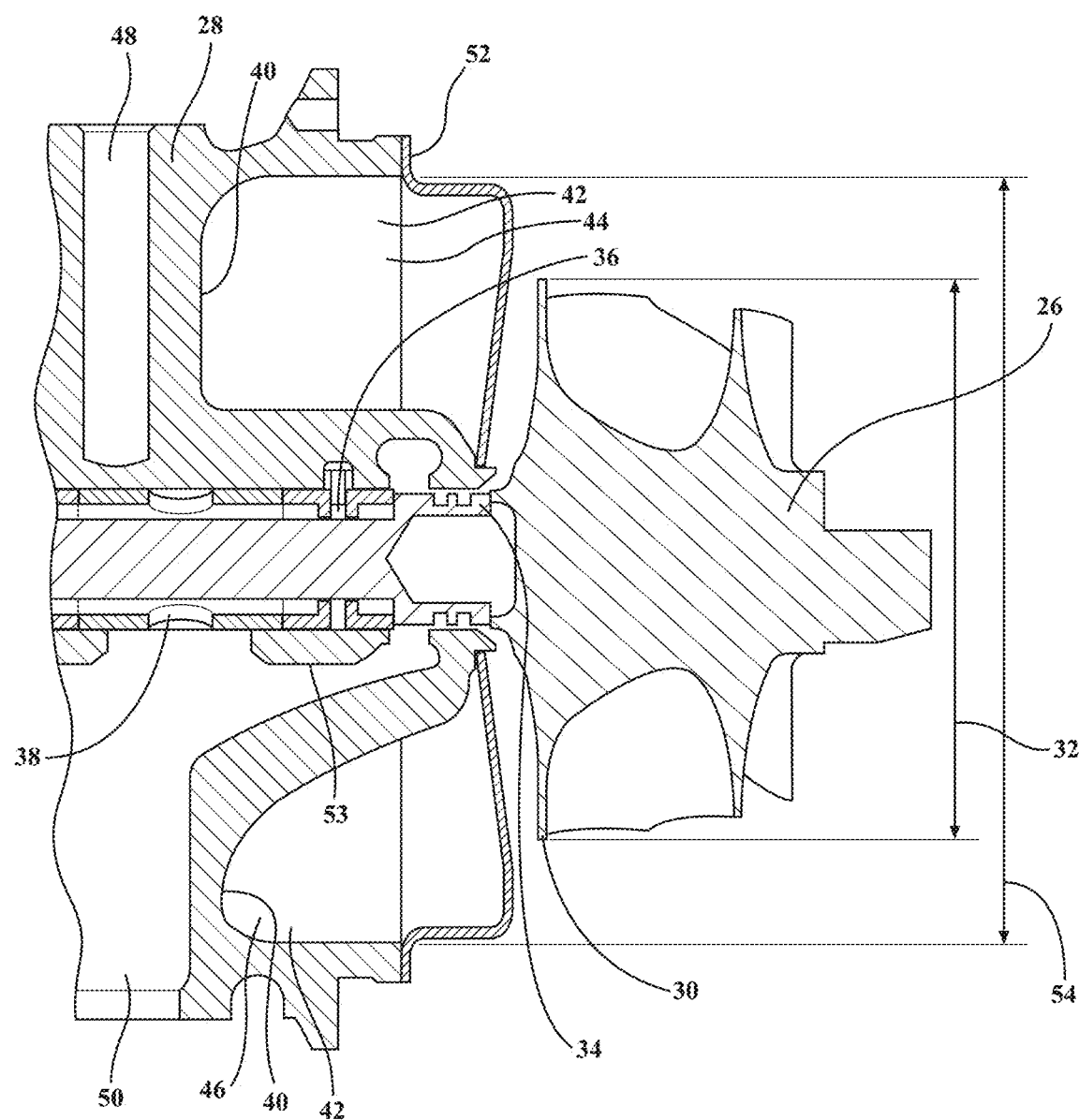
FIG. 2 is an enlarged cross-sectional view of the turbocharger of FIG. 1 illustrating a second diameter of the thermal dam.

Referring to FIGS. 1 and 2, the turbocharger 20 also may include a heat shield 52 disposed adjacent to the second end of the shaft 22 and configured to close the volume of the thermal dam 42. Although not required, the heat shield 52, when present, is disposed between the thermal dam 42 and the turbine wheel 26 and is configured to prevent air flow from the thermal dam 42. The thermal dam 42 is configured to encapsulate air between the thrust bearings 36 and the heat shield 52 to prevent the thrust bearings 36 and additional features in the bearing housing 28, including, but not limited to, the piston ring 34, and the seals 38, from overheating. It is contemplated that the heat shield 52 may not perfectly close the volume of the thermal dam 42 such that some air flow may occur from the thermal dam 42. The heat shield 52 as illustrated in FIG. 1, has a general L-shape and a fastening portion extending from the L-shape. However, it is contemplated that the heat shield 52 may be of any shape and/or size configured to close the volume of the thermal dam 42. In one example, the heat shield 52 is comprised of aluminum, however it is also contemplated that the heat shield 52 may be comprised of steel, polymer, or another material if desired.

In one example, as best illustrated in FIG. 2, the thermal dam 42 has a second diameter 54 extending radially from the shaft 22. As described above, the thermal dam 42 may not be symmetrical on the upper dam 44 and the lower dam 46. As such, the radially extending diameter is measured from the highest point to the lowest point perpendicular to the axis A. In one example, the second diameter 54 of the thermal dam 42 is between 1.1 and 1.2 times greater than the first diameter 32 of the turbine wheel 26. In another example, the second diameter 54 of the thermal dam 42 is between 1.13 and 1.16 times greater than the first diameter 32 of the turbine wheel 26. In yet another example, the second diameter 54 of the thermal dam 42 is between 1.14 and 1.15 times greater than the first diameter 32 of the turbine wheel 26.

Figure 3:
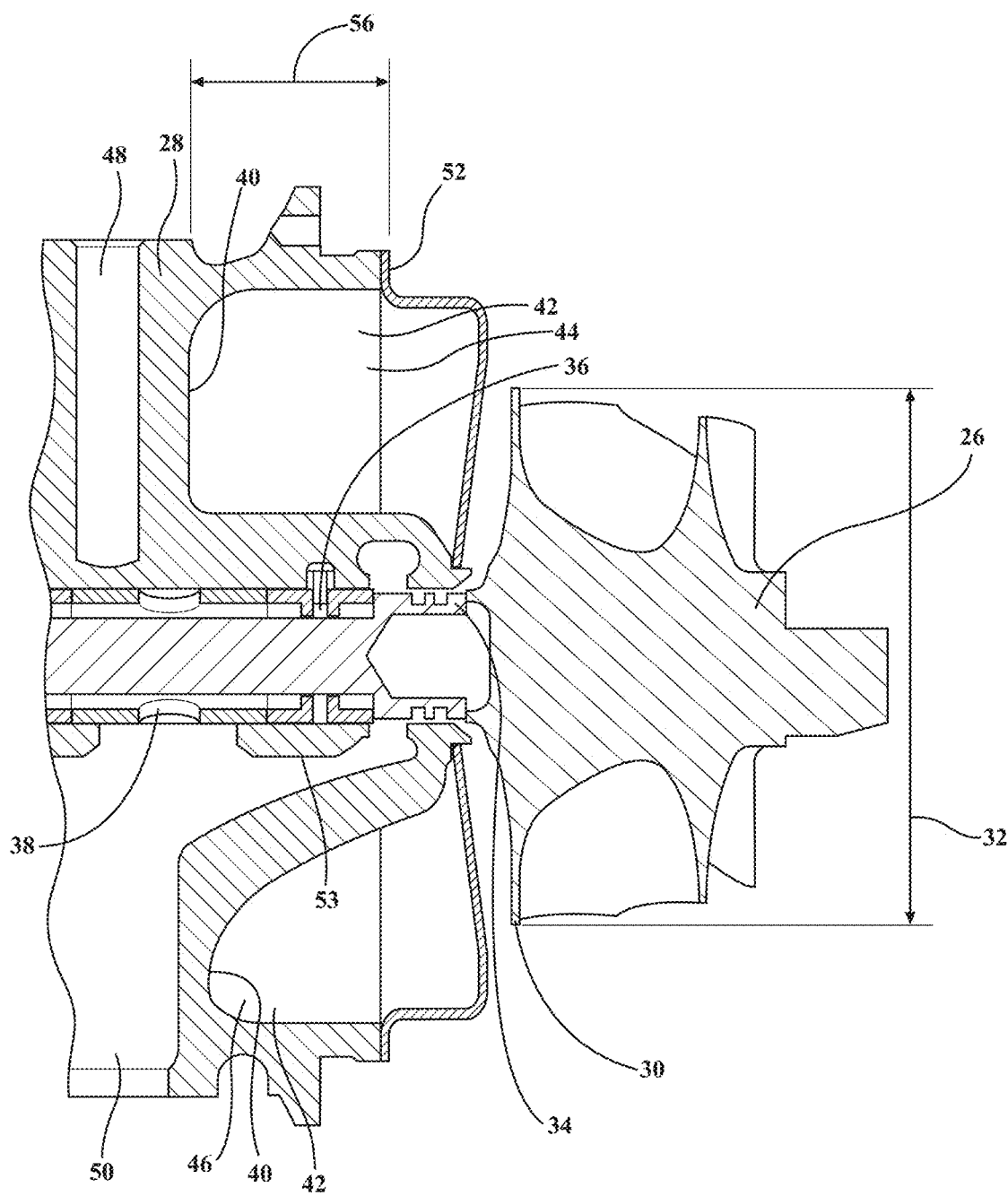
FIG. 3 is an enlarged cross-sectional view of the turbocharger of FIG. 1 illustrating an axial distance of the thermal dam.

Moreover, in another example, as best illustrated in FIG. 3, an axial distance 56 of the thermal dam 42 is defined between the inner bearing surface 40 and the heat shield 52. The axial distance 56 is measured parallel to the axis A. Moreover, similar to the second diameter 54 described above, the axial distance 56 is measured from the furthermost point of the thermal dam 42 from the turbine wheel 26 to the closest point of the thermal dam 42 from the turbine wheel 26 parallel to the axis A. In one example, the axial distance 56 of the thermal dam 42 is between 0.3 and 0.4 times the first diameter 32 of the turbine wheel 26. In another example, the axial distance 56 of the thermal dam 42 is between 0.32 and 0.37 times the first diameter 32 of the turbine wheel 26. In yet another example, the axial distance 56 of the thermal dam 42 is between 0.33 and 0.36 times the first diameter 32 of the turbine wheel 26. It is to be appreciated that the parameters for the axial distance 56 can be independent of or in combination with the parameters described above with respect to the second diameter 54 of the thermal dam 42.

In operation, the turbocharger 20 is activated which uses exhaust flow from the internal combustion engine 12 to spin the turbine wheel 26. The turbine wheel 26 in turn rotates the shaft 22 which rotates the compressor wheel 24 to deliver the compressed air to the internal combustion engine 12. However, exhaust flow is very hot which in turn leads to components of the bearing housing 28, such as the piston ring 34, the seals 38, and the thrust bearings 36, also getting hot and also to components near the bearing housing 28 getting hot such as a compressor cradle 51 or a turbine cradle 53, which is undesirable.

Figure 4:
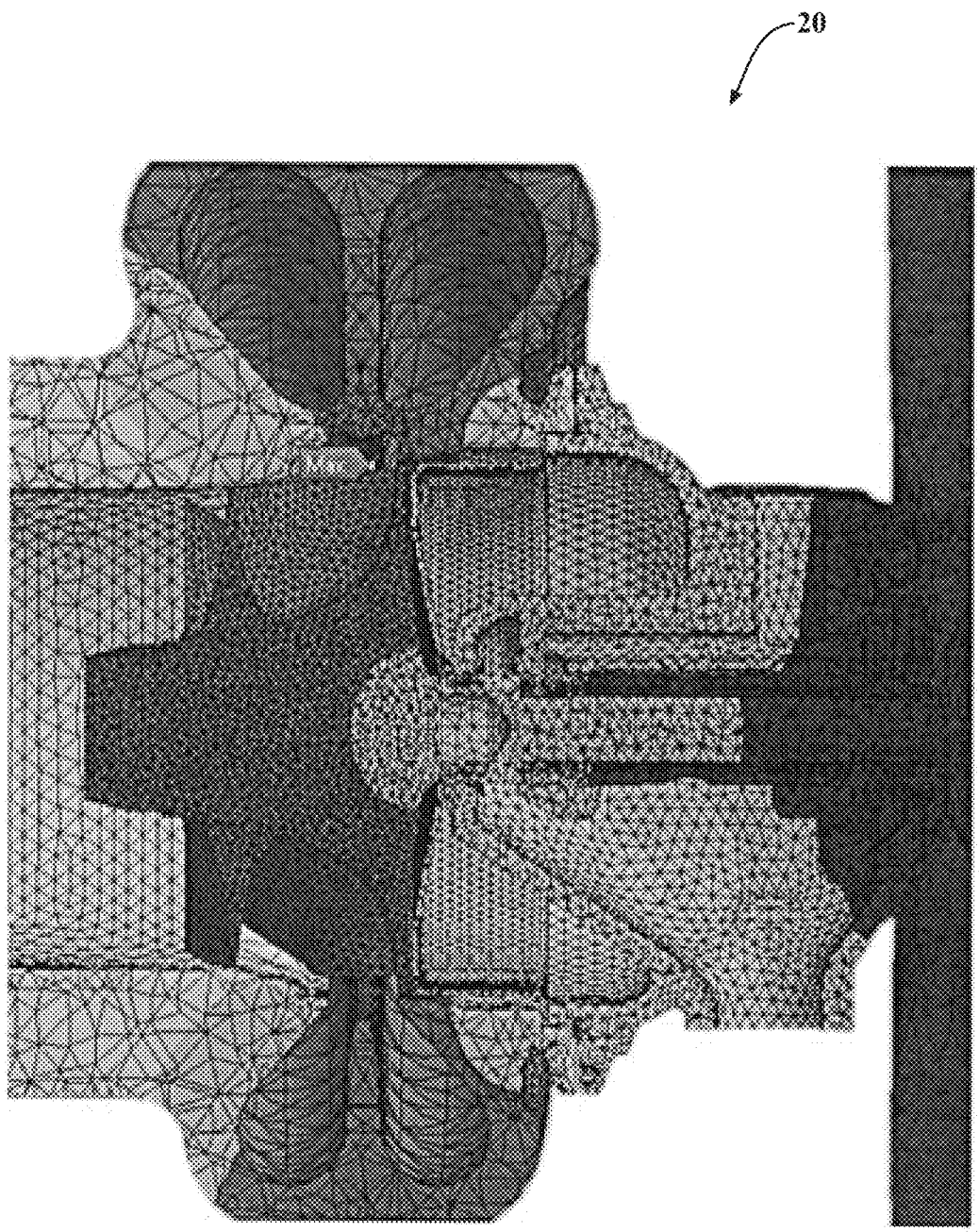
FIG. 4 is a partial enlarged cross-sectional view of the turbocharger of FIG. 1 including thermal imaging of the turbocharger in operation.
Figure 5:
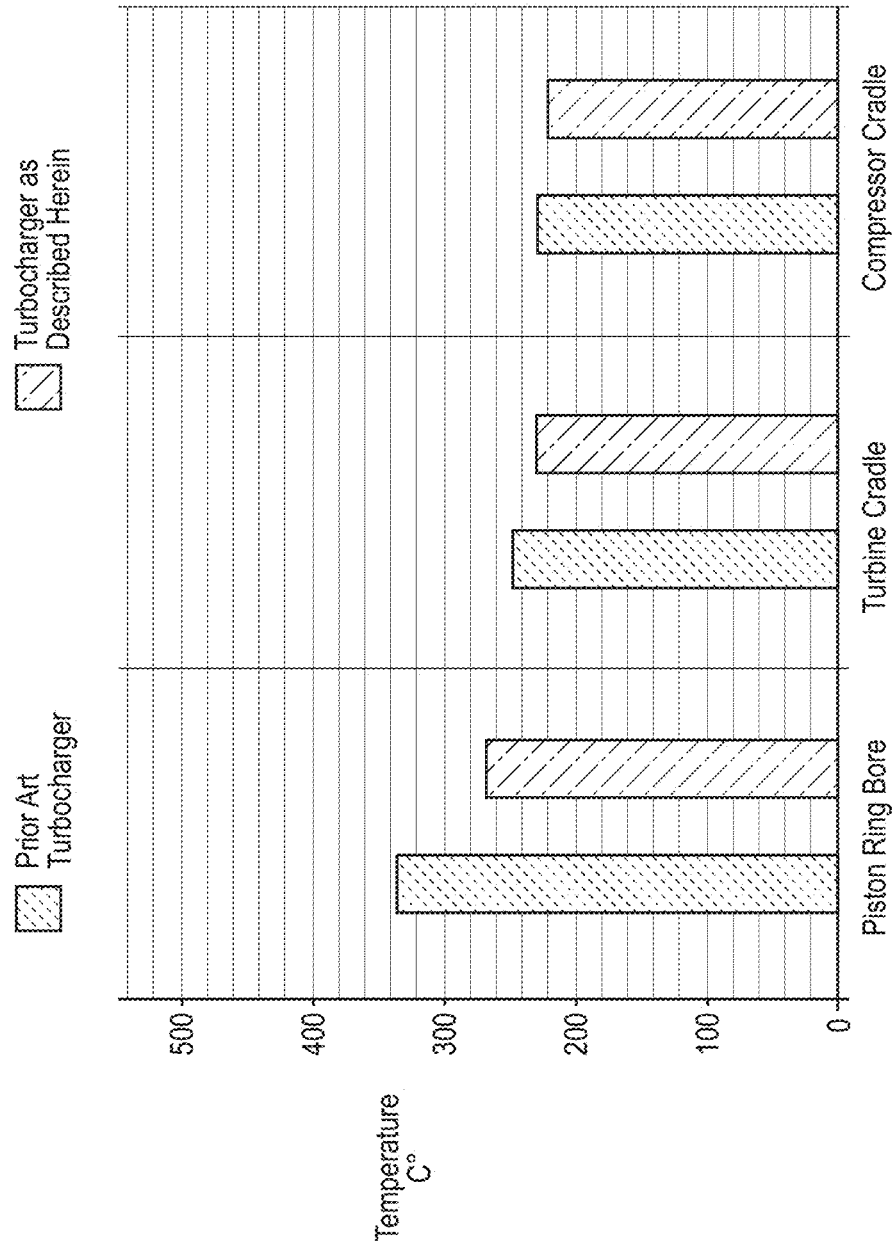
FIG. 5 is a graphical representation of operating temperatures of various components of various turbochargers including a prior art turbocharger and the turbocharger of FIG. 1.
Figure 6:
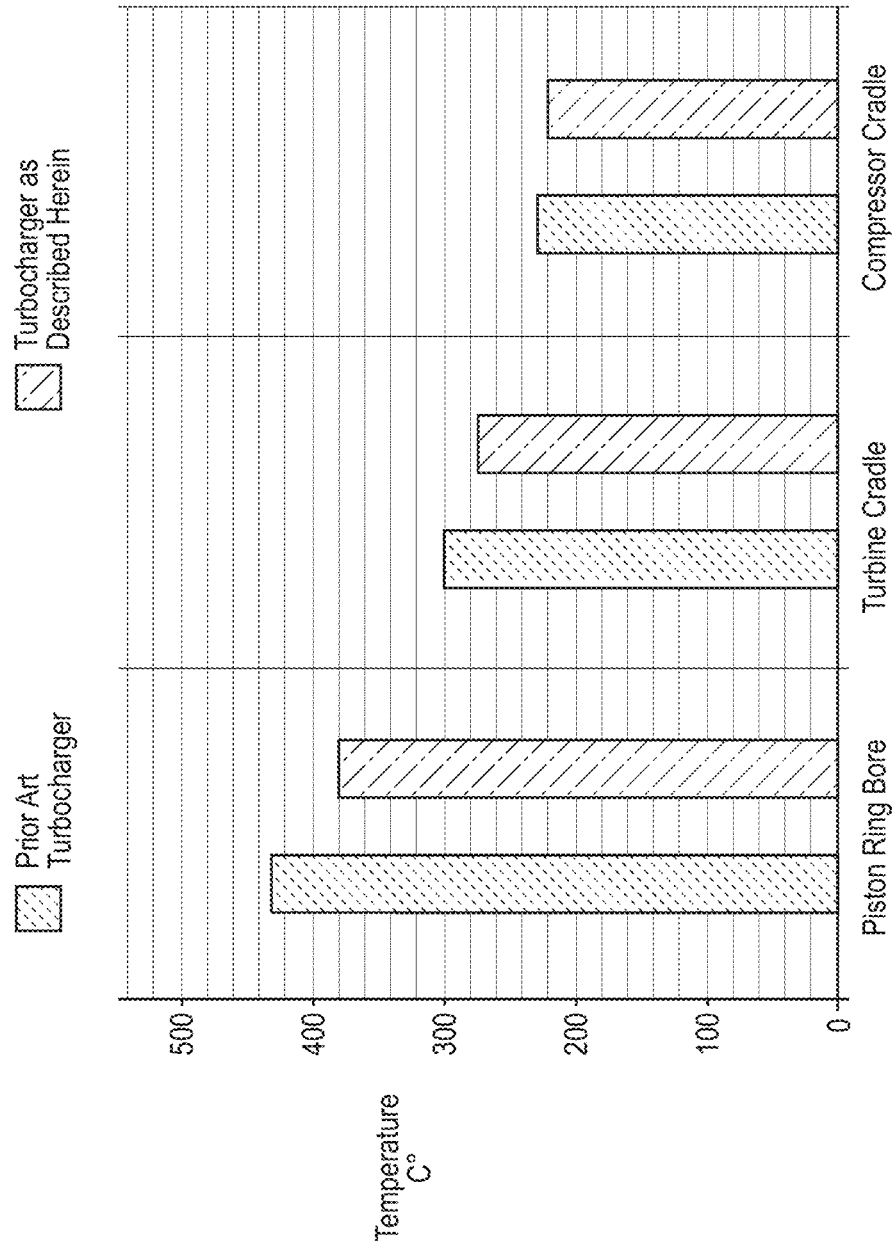
FIG. 6 is a graphical representation of hot shutdown temperatures of various components of various turbochargers including a prior art turbocharger and the turbocharger of FIG. 1.

Having the second diameter 54 of the thermal dam 42 being between 1.1 and 1.2 times greater than the first diameter 32 of the turbine wheel 26 and/or having the axial distance 56 of the thermal dam 42 between 0.3 and 0.4 times the first diameter 32 of the turbine wheel 26 reduces heat transfer to other components in the bearing housing 28, such as the piston ring 34, the seals 38 and the thrust bearings 36, and reduces heat transfer to the compressor wheel 24 during operation and also during hot shutdown of the turbocharger 20. This provides a myriad of benefits to the turbocharger 20 including, but not limited to, sealing improvements, increased compressor performance, and increased stability of the thrust bearings 36. Moreover, the thermal dam 42 as described above allows target temperatures of the turbocharger 20 to be reached without including water cooling, i.e., the turbocharger 20 as described herein is free from water cooling. This is clearly illustrated in the operational thermal imaging illustrated in FIG. 4 and in the graphical representations of FIGS. 5 and 6. More specifically, the darker areas of FIG. 4 represent a higher operating temperature while the lighter areas of FIG. 4 represent a lower operating temperature. Furthermore, components including, but not limited to, the bore in the bearing housing 26, the piston ring 34, the turbine cradle 53, and the compressor cradle 51 of the turbocharger 20 as described above each have a significantly reduced operating temperature versus a conventional turbocharger. Having a reduced operating temperature provides the improvements as described above including, but not limited to, sealing improvements, increased compressor performance, and increased thrust bearing 36 stability. Moreover, the turbocharger 20 as described herein includes increased performance of the thrust bearings 36 and also prevents the failing of the seals 38 during operation.

It is also to be understood that any ranges and subranges relied upon in describing various embodiments of the present disclosure independently and collectively fall within the scope of the appended claims and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e. from 0.1 to 0.3, a middle third, i.e. from 0.4 to 0.6, and an upper third, i.e. from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

What is claimed is:

1. A turbocharger for delivering compressed air to an internal combustion engine, said turbocharger comprising:
   a shaft extending along an axis between a first end and a second end spaced from said first end along said axis;
   a compressor wheel coupled to said first end of said shaft;
   a turbine wheel coupled to said second end of said shaft and having a first diameter; and
   a bearing housing extending about said shaft and disposed between said compressor wheel and said turbine wheel, said bearing housing having a thermal dam having a volume extending circumferentially about said shaft and disposed proximate to said second end of said shaft between said compressor wheel and said turbine wheel, with said thermal dam having a second diameter extending radially from said shaft;
   a heat shield disposed adjacent to said second end of said shaft and configured to close said volume of said thermal dam;
   wherein said second diameter of said thermal dam is between 1.1 and 1.2 times greater than said first diameter of said turbine wheel,
   wherein said bearing housing includes an inner bearing surface having said thermal dam, and
   wherein an axial distance of said thermal dam is defined between said inner bearing surface and said heat shield, and said axial distance of said thermal dam is between 0.3 and 0.4 times said first diameter of said turbine wheel.

2. The turbocharger of claim 1, wherein said second diameter of said thermal dam is between 1.13 and 1.16 times greater than said first diameter of said turbine wheel.

3. The turbocharger of claim 1, wherein said axial distance of said thermal dam is between 0.32 and 0.37 times said first diameter of said turbine wheel.

4. The turbocharger of claim 1, wherein said bearing housing is comprised of stamped metal.

5. The turbocharger of claim 1, wherein said bearing housing defining said thermal dam is produced by stamping.

6. The turbocharger of claim 1, wherein said bearing housing further defines a fluid inlet disposed adjacent to said thermal dam between said compressor wheel and said thermal dam for allowing a fluid into said bearing housing.

7. The turbocharger of claim 6, wherein said bearing housing further defines a fluid drain disposed adjacent to said thermal dam between said compressor wheel and said thermal dam for allowing excess fluid out of said bearing housing.

8. The turbocharger of claim 1, wherein said turbocharger is free of water cooling.

9. A turbocharger for delivering compressed air to an internal combustion engine, said turbocharger comprising:
a shaft extending along an axis between a first end and a second end spaced from said first end along said axis;
a compressor wheel coupled to said first end of said shaft;
a turbine wheel coupled to said second end of said shaft and having a first diameter;
a bearing housing extending about said shaft and disposed between said compressor wheel and said turbine wheel, said bearing housing including an inner bearing surface having a thermal dam having a volume extending circumferentially about said shaft and disposed proximate to said second end of said shaft between said compressor wheel and said turbine wheel; and
a heat shield disposed adjacent to said second end of said shaft and configured to close said volume of said thermal dam,
wherein an axial distance of said thermal dam is defined between said inner bearing surface and said heat shield and said axial distance of said thermal dam is between 0.3 and 0.4 times said first diameter of said turbine wheel.

10. The turbocharger of claim 9, wherein said axial distance of said thermal dam is between 0.32 and 0.37 times said first diameter of said turbine wheel.

11. The turbocharger of claim 9, wherein said bearing housing is comprised of stamped metal.

12. The turbocharger of claim 9, wherein said bearing housing further defines a fluid inlet disposed adjacent to said thermal dam for allowing a fluid into said bearing housing.

13. The turbocharger of claim 12, wherein said bearing housing further defines a fluid drain for allowing excess fluid to be removed from said bearing housing.

14. The turbocharger of claim 9, wherein said first diameter of said turbine wheel is between 50 and 150 mm.

15. A turbocharger for delivering compressed air to an internal combustion engine, said turbocharger comprising:
a shaft extending along an axis between a first end and a second end spaced from said first end along said axis;
a compressor wheel coupled to said first end of said shaft;
a turbine wheel coupled to said second end of said shaft and having a first diameter; and
a bearing housing extending about said shaft and disposed between said compressor wheel and said turbine wheel, said bearing housing having a thermal dam having a volume extending circumferentially about said shaft and disposed proximate to said second end of said shaft between said compressor wheel and said turbine wheel, with said thermal dam having a second diameter extending radially from said shaft;
wherein said second diameter of said thermal dam is between 1.1 and 1.2 times greater than said first diameter of said turbine wheel, and
wherein the first diameter is measured perpendicular to the axis and from a tip of a blade of the turbine wheel to a tip of an opposite blade of the turbine wheel.

16. A turbocharger for delivering compressed air to an internal combustion engine, said turbocharger comprising:
a shaft extending along an axis between a first end and a second end spaced from said first end along said axis;
a compressor wheel coupled to said first end of said shaft;
a turbine wheel coupled to said second end of said shaft and having a first diameter; and
a bearing housing extending about said shaft and disposed between said compressor wheel and said turbine wheel, said bearing housing having a thermal dam having a volume extending circumferentially about said shaft and disposed proximate to said second end of said shaft between said compressor wheel and said turbine wheel, with said thermal dam having a second diameter extending radially from said shaft;
wherein said second diameter of said thermal dam is between 1.1 and 1.2 times greater than said first diameter of said turbine wheel,
wherein said first diameter of said turbine wheel is between 50 and 150 mm.

* * * * *